US008845423B1

(12) United States Patent
Monahan et al.

(10) Patent No.: US 8,845,423 B1
(45) Date of Patent: Sep. 30, 2014

(54) ACCESSING A VIRTUAL MEDIA OBJECT WITHIN VIEWABLE LOCATION ON GAMEBOARD

(71) Applicant: Zynga Inc., San Francisco, CA (US)

(72) Inventors: Jay Monahan, Los Gatos, CA (US); Matthew Adam Ocko, Palo Alto, CA (US)

(73) Assignee: Zynga Inc., San Francisco, CA (US)

( * ) Notice: Subject to any disclaimer, the term of this patent is extended or adjusted under 35 U.S.C. 154(b) by 34 days.

(21) Appl. No.: 13/734,173

(22) Filed: Jan. 4, 2013

Related U.S. Application Data

(60) Provisional application No. 61/583,056, filed on Jan. 4, 2012.

(51) Int. Cl.
A63F 9/24 (2006.01)
A63F 13/00 (2014.01)

(52) U.S. Cl.
CPC ...................................... A63F 13/00 (2013.01)
USPC .................. 463/29; 463/40; 463/41; 463/42; 463/30; 463/31; 463/32; 463/33; 463/34

(58) Field of Classification Search
CPC . H04L 67/14; A63F 2300/5553; A63F 13/12; A63F 2300/807; A63F 2300/5506; A63F 2300/609; A63F 2300/575; G06Q 30/00; G06Q 30/0601
USPC .................... 463/30–34, 40–42, 29
See application file for complete search history.

(56) References Cited

U.S. PATENT DOCUMENTS

| 2002/0154174 | A1* | 10/2002 | Redlich et al. ................. 345/848 |
| 2007/0072676 | A1* | 3/2007 | Baluja ............................. 463/42 |
| 2007/0218997 | A1* | 9/2007 | Cho ................................. 463/42 |
| 2008/0004116 | A1* | 1/2008 | Van Luchene et al. ......... 463/42 |
| 2009/0299960 | A1* | 12/2009 | Lineberger ....................... 707/3 |
| 2010/0030660 | A1* | 2/2010 | Edwards ......................... 705/27 |
| 2010/0121810 | A1* | 5/2010 | Bromenshenkel et al. ..... 706/54 |

* cited by examiner

Primary Examiner — Justin Myhr
(74) Attorney, Agent, or Firm — Schwegman Lundberg & Woessner, P.A.

(57) ABSTRACT

A system, computer-readable storage medium storing at least one program, and a computer-implemented method for entering a viewable location on a gameboard having a virtual media object capable of presenting a media item within a media are presented. A game instance of a computer-implemented game is generated, where the game instance is associated with a game state of a player using a virtual gameboard. A graphical user interface displaying an exterior of one or more virtual buildings associated with the game instance is provided. A request to view an interior of a virtual structure is received via a device of the player. In response to the request, the interior of the virtual structure is displayed, including displaying a virtual media object in the interior of the virtual structure. The virtual media object is associated with a media playable to the player upon request.

29 Claims, 14 Drawing Sheets

ACCESSING A VIRTUAL MEDIA OBJECT WITHIN VIEWABLE LOCATION ON GAMEBOARD

RELATED APPLICATION

The present application claims the benefit under 35 U.S.C. 119(e) of U.S. Provisional Patent Application Ser. No. 61/583,056, filed Jan. 4, 2012, which is incorporated herein by reference in its entirety.

TECHNICAL FIELD

The present disclosure relates to a virtual media object within a viewable or zoomable location on a gameboard for a virtual game. In an example embodiment, a player may be given the ability to view or zoom into an interior of a viewable or zoomable location on a gameboard (e.g., a music hall, art gallery, newsroom, theater, etc.). The interior of the viewable or zoomable location may display a virtual media object that is associated with a set of media playable to the player (e.g., music, videos, photos, news articles, etc.). The player may be given the ability to play or view an item within the set of media and may also be given the ability to invite friends to experience the item being played. The item being played may also be played in a virtual venue, such as a music hall or a theater.

BACKGROUND

Many games attract players due to the social nature of the game. A player may play the game using the player's own virtual gameboard. The player's virtual gameboard may provide the player with access to communication tools for communicating with other players. Such social games are appealing because players can advance in the game and inform their social network of their advancement in the game, which may provide for friendly competition and be an incentive for players to continue playing. While many of these games provide forums for communication between players, these means of communication may be one of the few ways for players to interact with each other while playing these games.

Additionally, media such as music, videos, photos, and news articles have always been popular. The ability to download and experience these media from the Internet has increased the sales of such media and has given individuals an outlet for sharing different works, including their own works.

While the popularity of games and the social networking available through these games increases, the ability to download and experience media via these games is lacking.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
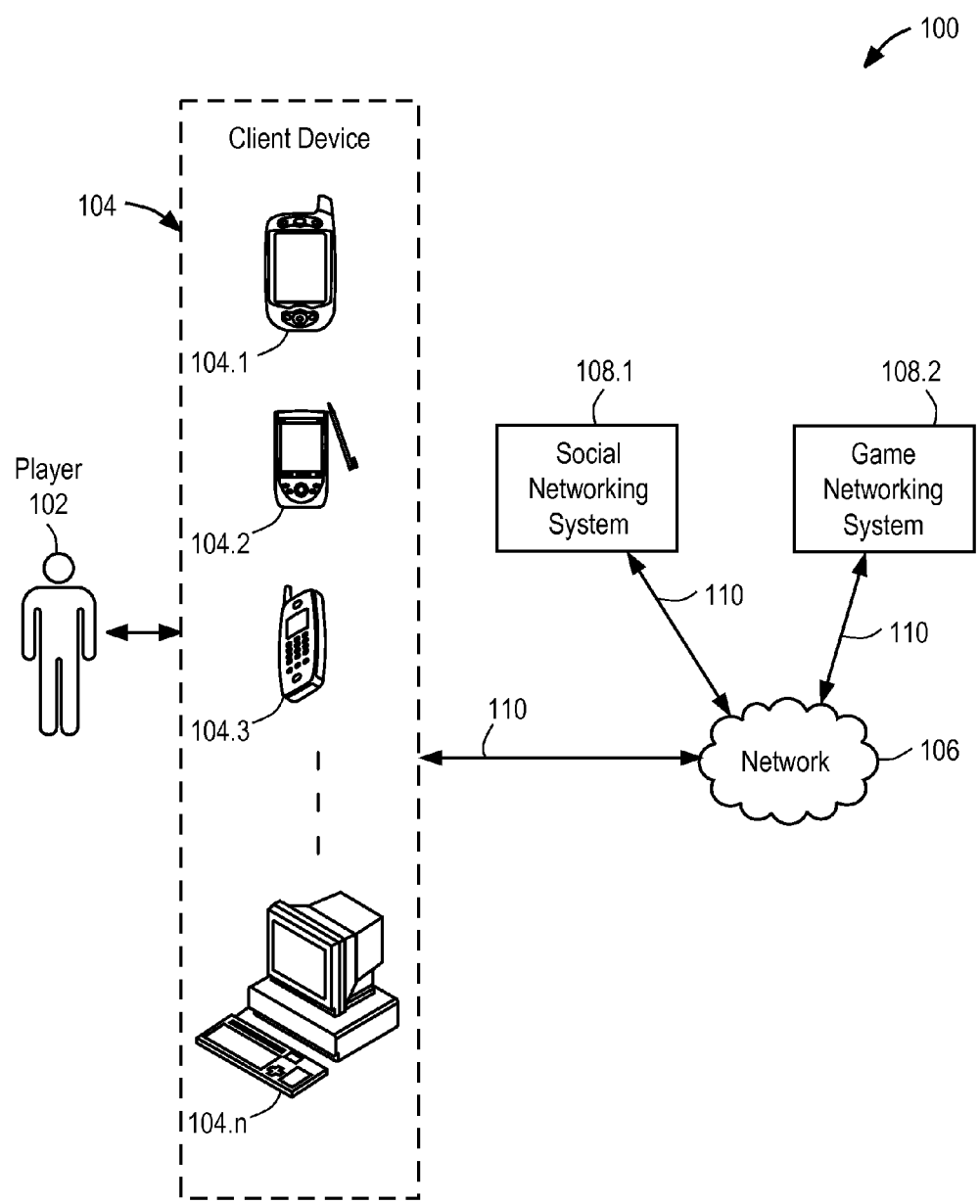
FIG. 1 is a schematic diagram illustrating an example of a system, according to some embodiments.

Players of a computer-implemented virtual game (e.g., online game) may be provided with a graphical user interface for playing the game, which displays a virtual gameboard. The virtual gameboard of a player may display one or more virtual structures associated with the player's game. For example, in the virtual game CityVille by Zynga, Inc., a user (e.g., a player) may build a city by placing one or more virtual structures (e.g., buildings) in certain locations within the player's gameboard. The virtual structures may be any structure that may be in a game, such as a natural structure (e.g., a cave), a man-made structure (e.g., a building), and the like. The virtual structures may be zoomable. That is, the virtual structures may be zoomed into to view the interior of the structure.

When a view or zoom request for zooming into a virtual structure is received from a player, the gameboard may zoom into the virtual structure and display the interior of the virtual structure. The interior of the virtual structure may contain a virtual media object that is associated with a set of media presentable or playable to the player. For example, the virtual media object may be displayed as a virtual jukebox or simply any object for viewing a list of selectable media capable of being played. The set of media associated with the virtual media object may include any media which the player has added to the player's collection of media and can include any type of media from an accessible source (e.g., streaming a song or a sample of a song, streaming video, photos from different sources including the player's stored photos, archived news articles, etc.). Additionally, the set of media may include media that the player may select and add to the player's collection. The set of media may be updated to reflect any changes in the availability of media and those changes may be highlighted to indicate the changes in availability to the player (e.g., new songs available for presenting). When the player accesses the virtual media object, a list of media (e.g., music, videos, photos, news articles, etc.) may be displayed, allowing a user to select an item from the list of media. A present or presentation request may be received from the player requesting that an item from the list of media be presented, played or viewed. In response, the item may be presented to the player.

In some embodiments, when an item is being presented, an option to purchase the item may be displayed. Additionally, recommendations for other media can be made based on the item being presented. For example, if a jazz song is being presented, recommendations for other jazz songs that the player might enjoy may be displayed. The recommendations may highlight (e.g., via animation) any updates to available media, such as new media recently available. Furthermore, the player may be given an opportunity to comment on the item being presented.

In some example embodiments, when a presentation request is received, the gameboard may display a virtual venue for performing the item. For example, if the item is a song, the gameboard may display a virtual venue that is a music or concert hall. The virtual venue may display an animation of the artist of the song performing the song and a virtual audience viewing the performance. In another example, if the item is a video, the gameboard may display a virtual venue that is a theater as the zoomable virtual structure. The virtual venue may display a virtual movie screen that plays the video and a virtual audience viewing the performance. In yet another example, if the item is a photo, the gameboard may display a virtual venue that is an art gallery as the zoomable virtual structure. The virtual venue may display the photos as if they were hanging on a wall in an art gallery. In yet another example, if the item is a news article, the gameboard may display a virtual venue that is a newspaper company as the zoomable virtual structure. The virtual venue may display news articles chosen by the player.

In some embodiments, the virtual audience may include avatars for additional players that are also associated with the item being presented. For example, the additional players may be players that also enjoy the item being presented, players that were invited to experience the item being presented, players that also have the item being presented in their collection of media, and the like. These additional players may also be associated with the player via the player's social network. In some embodiments, additional players that may access a zoomable virtual structure to experience media may also be provided the ability to select and play any media available in the zoomable virtual structure.

In some embodiments, the player may block other players from experiencing the media being presented in the virtual zoomable structure, or other players may be automatically blocked based on the blocked player's status (e.g., the blocked player's frequency of play, social actions, game levels achieved, etc.). In this case, blocked players may bribe their way into the virtual structure to get around the blocking. For example, blocked players may pay a virtual doorman either legal or virtual currency to enter the virtual structure.

Example System

FIG. 1 is a schematic diagram illustrating an example of a system 100 for implementing various example embodiments. In some embodiments, the system 100 comprises a player 102, a client device 104, a network 106, a social networking system 108.1, and a game networking system 108.2. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 104 may be any suitable computing device (e.g., devices 104.1-104.$n$), such as a smart phone 104.1, a personal digital assistant (PDA) 104.2, a mobile phone 104.3, a personal computer 104.$n$, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1. The client device 104 may be any suitable computing device, such as a personal computer, laptop, cellular phone, smart phone, computing tablet, and the like.

The social networking system 108.1 may include a network-addressable computing system that can host one or more social graphs (see for example FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games (for example, online games). The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2. In various example embodiments, the game networking system 108.2 may include an introduction mechanic that can introduce a player of the game networking system 108.2 to other players of the game networking system 108.2 that are encountering a common in-game obstacle.

Although FIG. 1 illustrates a particular example of the arrangement of the player 102, the client device 104, the social networking system 108.1, the game networking system 108.2, and the network 106, this disclosure includes any suitable arrangement or configuration of the player 102, the client device 104, the social networking system 108.1, the game networking system 108.2, and the network 106.

Figure 2:
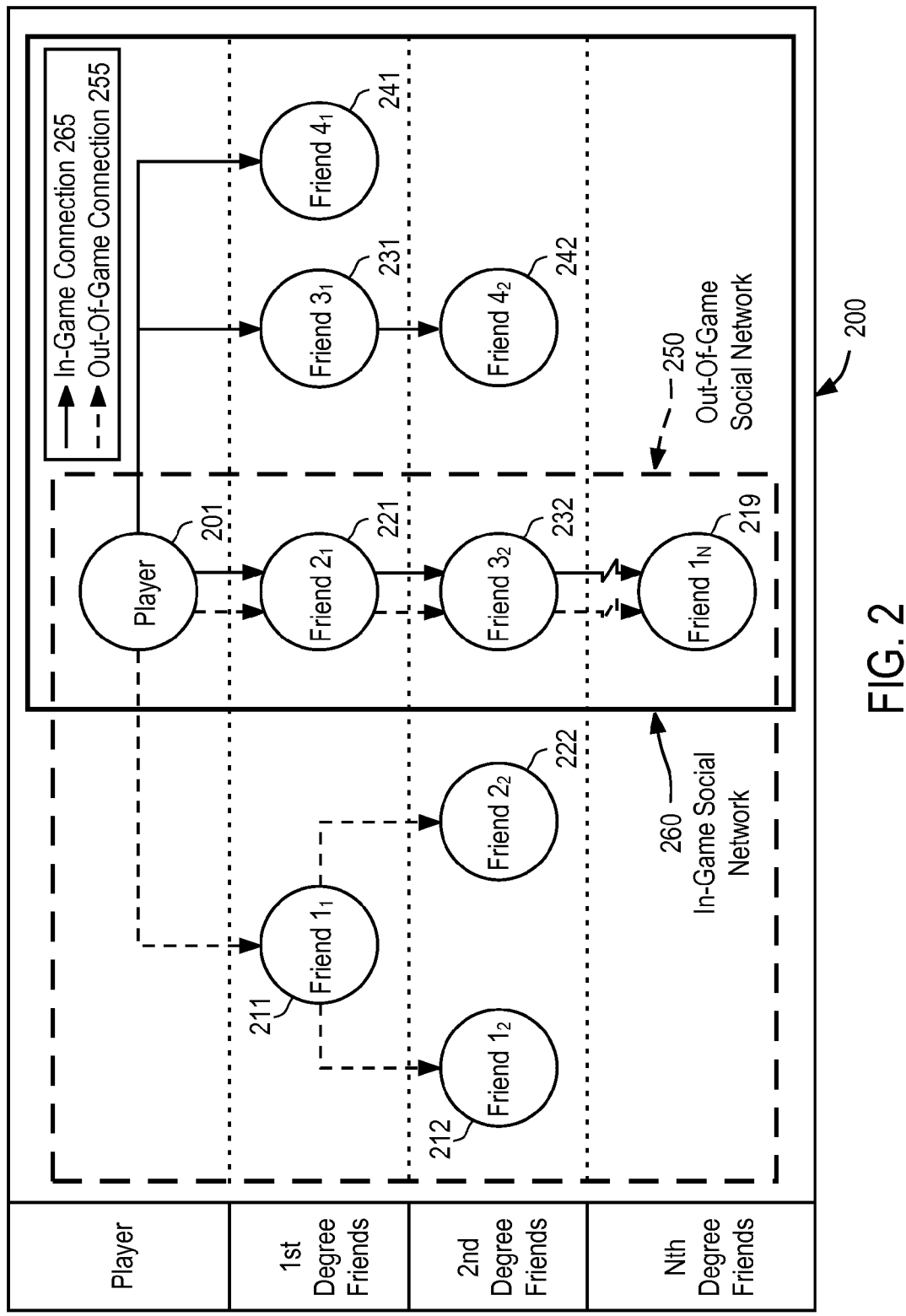
FIG. 2 is a schematic diagram illustrating an example of a social network within a social graph, according to some embodiments.

FIG. 2 is a schematic diagram illustrating an example of a social network within a social graph 200. Social graph 200 is shown by way of example to include an out-of-game social network 250 and an in-game social network 260. Moreover, in-game social network 260 may include one or more players that are friends with Player 201 (e.g., Friend $3_1$ 231), and may include one or more other players that are not friends with Player 201. The social graph 200 may correspond to the various players associated with the virtual game. In an example embodiment, each player may have a virtual gameboard containing one or more virtual structures. When, for example, Player 201 visits the virtual gameboard of Friend 3₁ 231, Player 201 may be able to enter a virtual structure on the virtual gameboard of Friend 3₁ 231 and be able to experience media being performed within the virtual structure.

Example Performance of Media from Virtual Media Object

It is to be appreciated that the virtual gameboard for a game may be presented to the player in a variety of manners and may depict a variety of virtual objects and zoomable locations. A player of the game may have a zoomable virtual structure on the player's virtual gameboard. When a player zooms into the virtual structure, the interior of the structure may be displayed. The structure may contain a virtual media object associated with a set of media playable to the player, including music, video, photos, news articles, and the like. The player may select an item within the set of media to play, and the item may be performed. The performance of the item may include displaying a virtual venue on the gameboard for performing the item. For example, the virtual venue may include a music hall, a theater, an art gallery, a newsroom, and the like, for playing the media to an audience. Thus, the virtual gameboard provides to the player a number of outlets for posting, accessing, and experiencing media by the player and by additional players associated with the player of the virtual gameboard without the player having to exit the gameboard to access the media.

Figure 3:
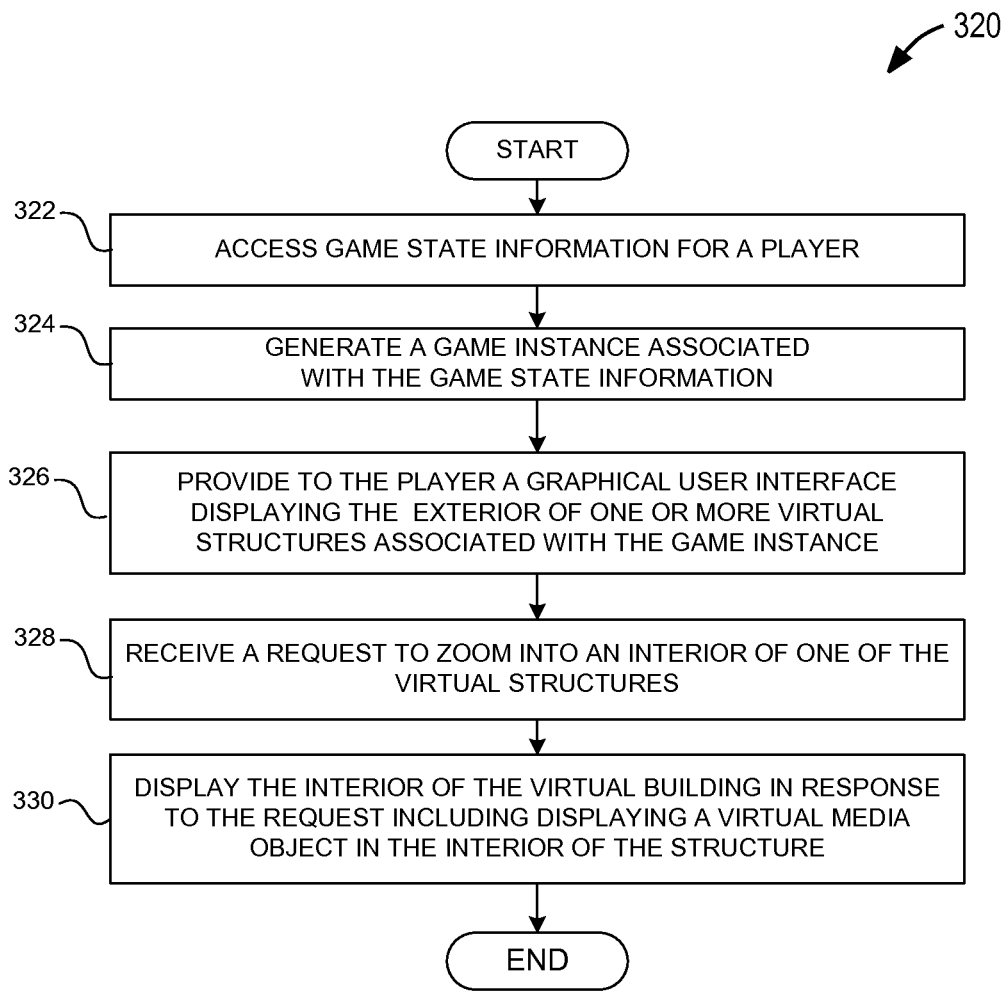
FIG. 3 is a flowchart illustrating an example method for viewing or zooming into an interior of a virtual structure having a virtual media object in response to a view or zoom request, according to some embodiments.

FIG. 3 is a flowchart illustrating an example method 320 for zooming into an interior of a virtual structure having a virtual media object in response to a request to view the interior of the virtual structure. In some embodiments, the virtual media object may be displayed when displaying the interior of the virtual structure but may not be displayed while displaying the exterior of the virtual structure. In some embodiments, displaying the interior of the virtual structure may include displaying the interior of the virtual structure without displaying the exterior of the virtual structure, and vice versa. In some embodiments, the method 320 may be performed using the game networking system 108.2 and may present a player with the ability to zoom into a virtual structure to access a virtual media object associated with a set of media capable of being presented to the player. The media may include, but are not limited to, music, videos, photos, news articles, and the like.

A virtual media object may be any virtual object associated with media such as music, videos, photos, news articles, and the like. The virtual media object may be any object that a player may use to access, post, or store media or a set of media. In some embodiments, the virtual media object may provide to the player access to one or more icons or a list of selectable media capable of being presented. In some embodiments, the virtual media object may be displayed as a jukebox containing a list of music that can be presented.

The method 320 may begin, at operation 322, by accessing game state information for a player playing a computer-implemented multiplayer game via a hardware-implemented game generation module. At operation 324, the method 320 may generate, via the hardware-implemented game generation module, a game instance of the game to be displayed on a virtual gameboard of the player. The game instance that is generated may be associated with the game state information accessed in operation 322.

At operation 326, a graphical user interface displaying the exterior of one or more virtual structures associated with the game instance is provided to the player on the player's virtual gameboard via display data provided by a hardware-implemented display module. Any one of the virtual structures that may be displayed may be a zoomable virtual structure. That is, the virtual structure may be zoomed into to view the interior of the virtual structure. In some embodiments, the virtual structures capable of being zoomed into may become highlighted when a player moves their cursor or pointer over the zoomable virtual structure.

At operation 328, a request to view an interior of one of the virtual structures may be received at a hardware-implemented presentation module. The request may be initiated by the player when the player requests to enter a particular zoomable virtual structure. At operation 330, in response to the request, the interior of the virtual structure is displayed using display data provided by the hardware-implemented display module. This includes displaying in the interior of the virtual structure a virtual media object associated with a set of media playable to the player. The player may access media via the virtual media object once the interior of the virtual structure is displayed. When a player requests that a particular item within the set of media be presented, the item may be presented in response to the presentation request.

Figure 4:
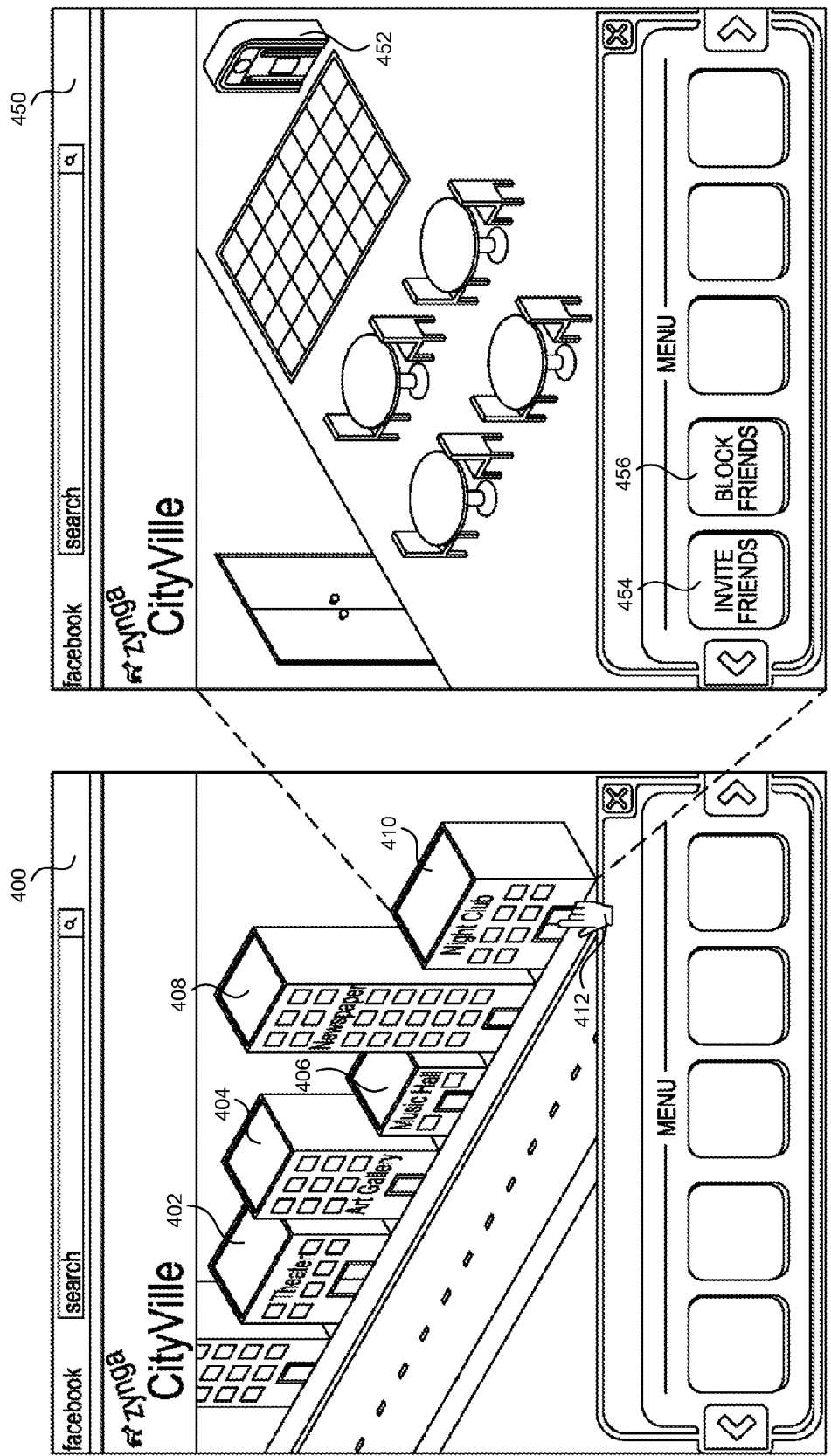
FIG. 4 is a user interface diagram showing example user interfaces depicting viewing or zooming into an interior of a virtual structure, according to some embodiments.

FIG. 4 is a user interface diagram showing example graphical user interfaces 400 and 450 depicting zooming into an interior of a virtual nightclub 410. The graphical user interface 400 displays a gameboard having virtual structures or virtual venues, including a theater 402, an art gallery 404, a music hall 406, a newspaper company 408, and a nightclub 410. These virtual structures and venues may be capable of displaying a performance of a set of media chosen by the player.

A player may zoom into any zoomable virtual structure by clicking on the virtual structure using the cursor or pointer 412. In some embodiments, when the player moves the pointer 412 over a virtual structure, the virtual structure may become highlighted or may include any type of indication to indicate that the structure may be zoomed into. In some embodiments, the virtual building may also include an indication that the virtual building may have additional content in the interior of the building that the player may not have viewed yet since the last time the player zoomed into the virtual building. In the example of FIG. 4, if the player clicks on the nightclub 410, the gameboard may display a zoomed in view of the nightclub 410 via the graphical user interface 450. The graphical user interface 450 depicts an interior of the nightclub 410.

In the interior of the nightclub 410, there may be a virtual media object associated with a set of media playable to the player. In the example of FIG. 4, the virtual media object is displayed as a jukebox 452. The jukebox 452 may be associated with media such as music, which may be accessed and presented by the player.

In some embodiments, the virtual media object may include any media that was previously selected by the player and added to the player's collection that is accessible by the virtual media object. In some embodiments, the virtual media object may include any additional media that the player may wish to add to the player's collection of accessible media, such as recommendations for media that the player might like.

The player may have the option of inviting friends to the nightclub 410 via the Invite Friends icon 454 on the menu. The player may invite other players to access the zoomable virtual structure so that the other players may be able to enjoy the media being presented. In some embodiments, the other players that may be invited may include people that are part of the player's social network.

The player may additionally have the option of blocking friends from the zoomable virtual structure via the Block Friends icon 456 on the menu. The player may block other players so that they do not have access to the virtual structure and may not experience media being presented in the virtual structure.

In some embodiments, the player may additionally be able to zoom into the theater 402 to access a virtual media object providing access to videos. The interior of the theater 402 may be displayed as a virtual movie screen with a viewing audience. The videos may be presented on the virtual movie screen within theater 402.

In some embodiments, the player may additionally be able to zoom into the art gallery 404 to access a virtual media object providing access to photos. The interior of the art gallery 404 may be displayed as a room with photos hanging on the wall of the art gallery, and the photos can be viewed in this manner.

In some embodiments, the player may additionally be able to zoom into the music hall 406 to access a virtual media object providing access to music. The interior of the music hall 406 may be displayed as a music or concert hall with a stage for performers and a viewing audience. The music may be presented via animated performers performing the music on stage.

In some embodiments, the player may additionally be able to zoom into the newspaper company 408 to access a virtual media object providing access to news articles. The interior of the newspaper company 408 may be displayed as a newsroom with access to articles that can be read from within the newsroom.

Additionally, any of the virtual structures depicted in the example of FIG. 4 may be community structures that provide access to top-rated media instead of media chosen by the player and added to the player's collection. For example, theater 402 may be a community theater containing a virtual media object providing access to top-rated videos.

Figure 5:
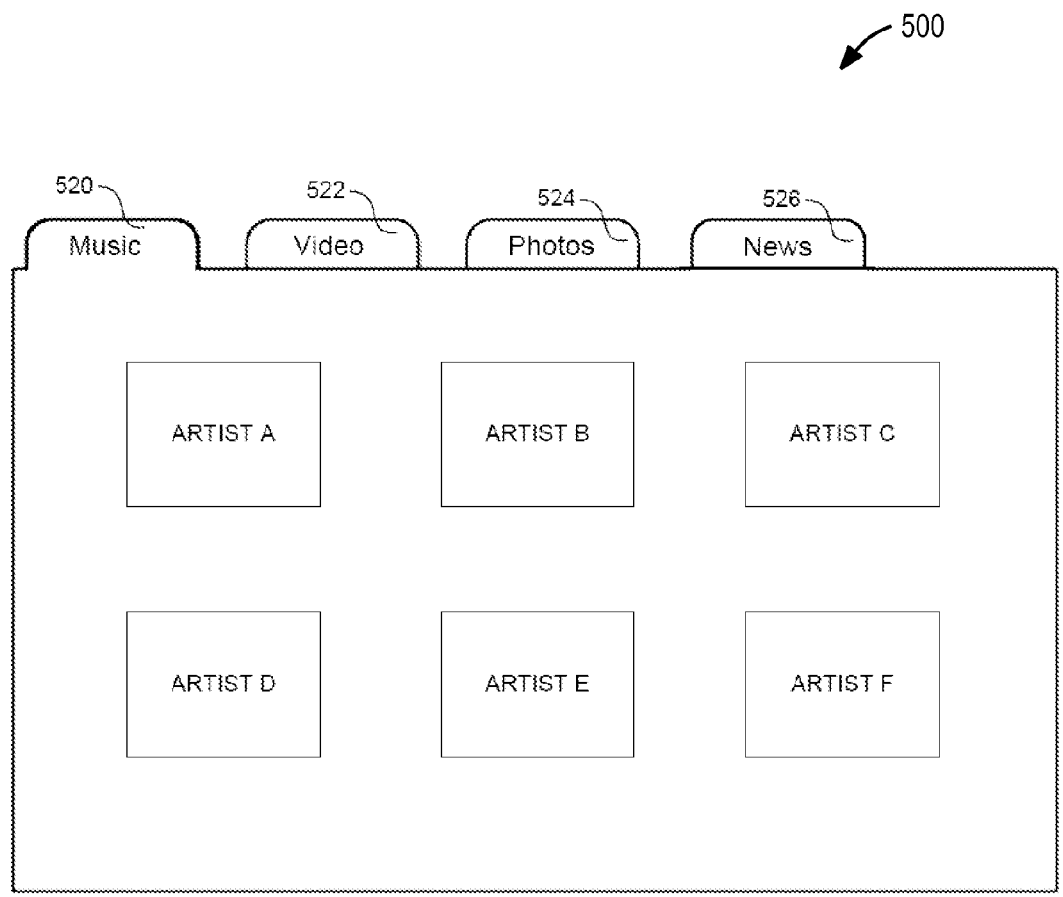
FIG. 5 is a user interface diagram showing an example user interface depicting a menu for selecting media, according to some embodiments.

FIG. 5 is a user interface diagram showing an example user interface 500 depicting a menu for selecting media. In some embodiments, the example user interface 500 depicted in FIG. 5 may be the virtual media object associated with a set of media that can be found when a virtual structure is entered by the player. The example user interface 500 of FIG. 5 may provide icons or a list of media available to the player. The media accessible via the example user interface 500 may be accessed via the music tab 520, the video tab 522, the photos tab 524, and the news tab 526. The media within each of these tabs may be sorted in any organized manner. In the example of FIG. 5, the music tab 520 is sorted by artist.

Figure 6A:
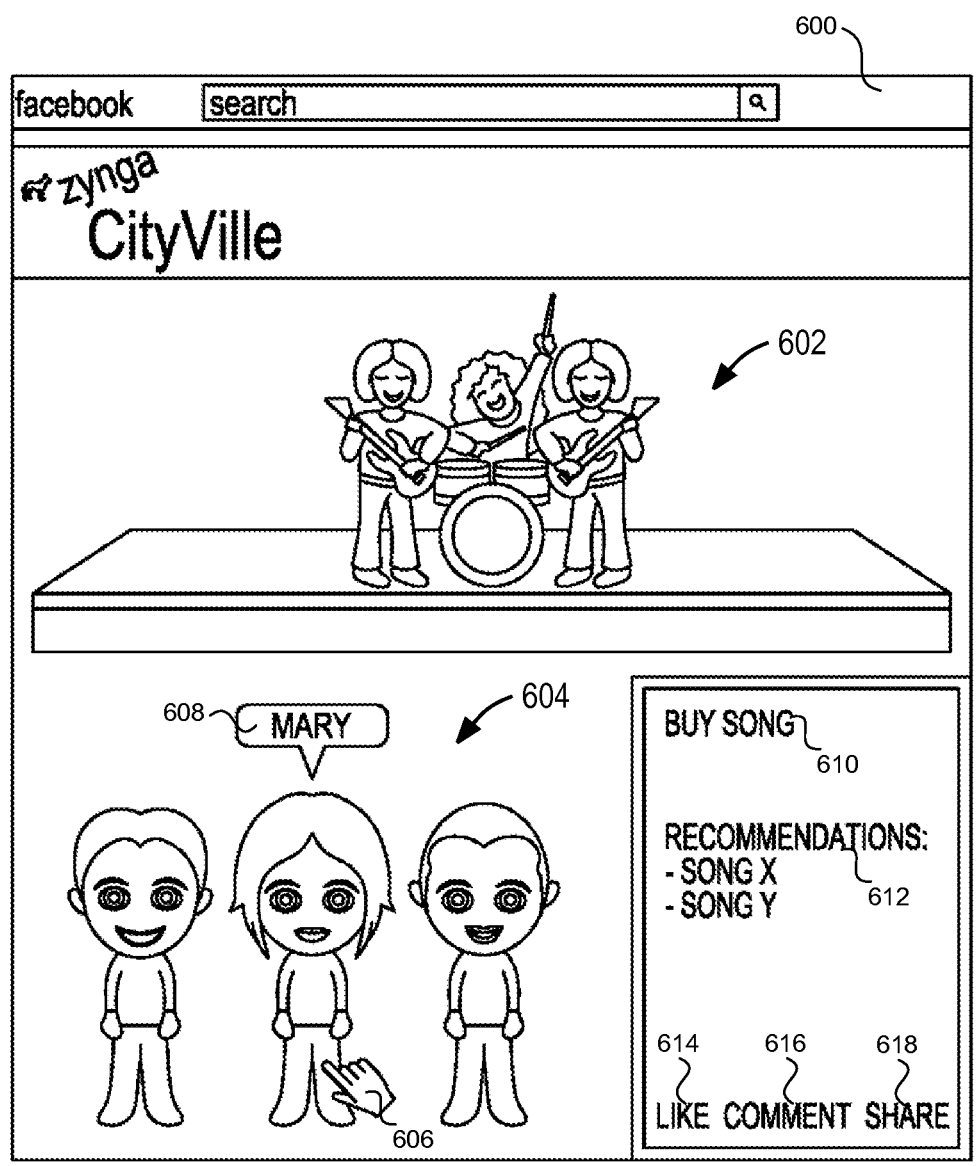
FIGS. 6A and 6B are user interface diagrams showing example user interfaces depicting virtual venues for performing a requested item within a set of media, according to some embodiments.
Figure 6B:
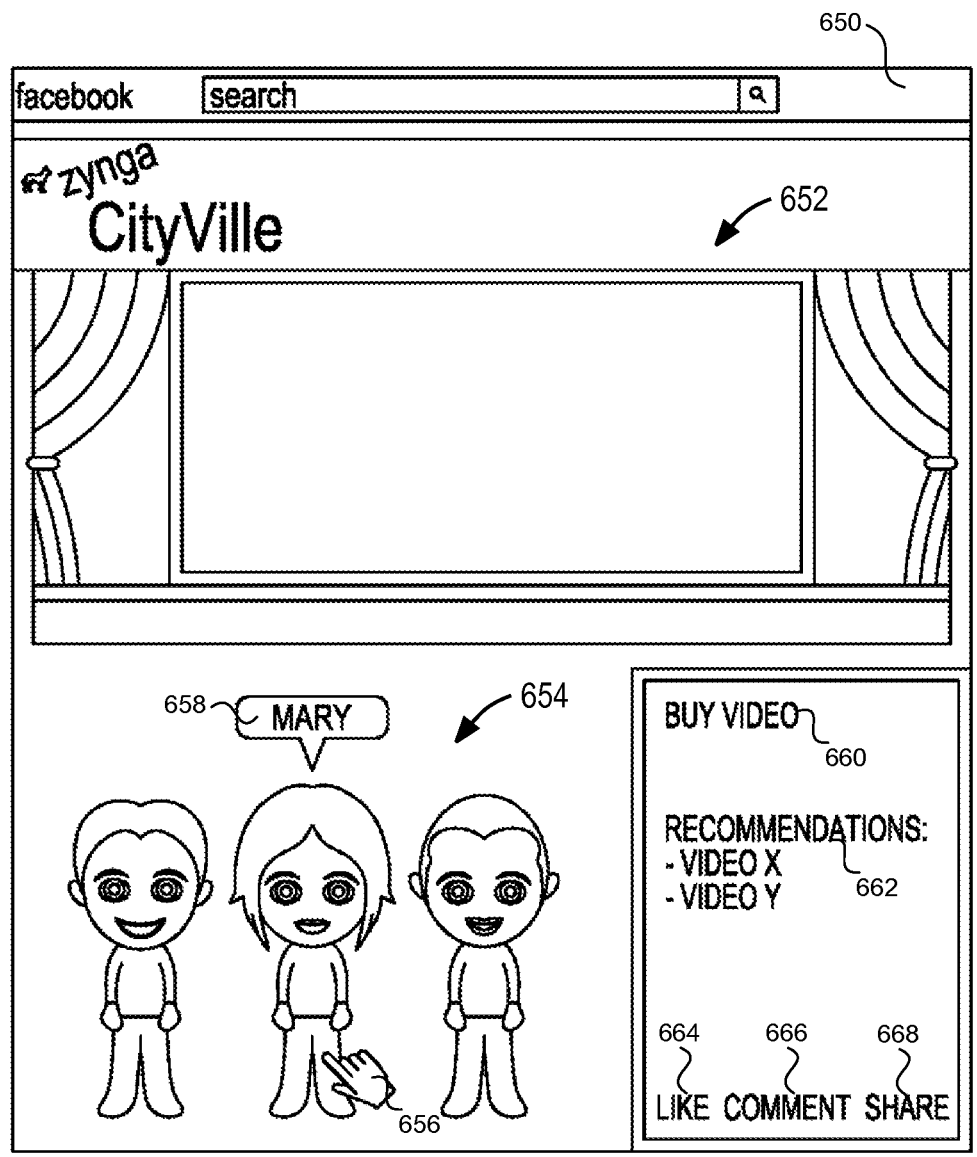

FIGS. 6A and 6B are user interface diagrams showing example user interfaces depicting virtual venues for performing a requested item within a set of media. FIG. 6A is a user interface diagram showing an example user interface 600 for playing a song in a virtual venue (e.g., a music hall). FIG. 6B is a user interface diagram showing an example user interface 650 for playing a video in a virtual venue (e.g., a theater).

In the example of FIG. 6A, the virtual venue may be displayed as a music or concert hall. When a presentation request to present an item within a set of media is received, the item may be presented in the virtual venue in response to the presentation request. In the example of FIG. 6A, once a presentation request is received, the virtual venue for playing the item may be displayed, including displaying a stage with animated performers 602 and an audience 604. The animated performers 602 may then present the selected item via the animated performance.

The audience 604 in the example user interface 600 may be displayed in the virtual venue. The audience 604 may include avatars for one or more additional players associated with the item being presented. For example, the audience may include avatars for one or more additional players who have been invited by the player to experience the item being presented, one or more additional players who also have the item within their collection of media, one or more additional players who have indicated that they enjoy the item being presented, and the like. Additionally, the player may use the pointer 606 to hover over an avatar of one or more players so that the name 608 of the player may be displayed.

The example user interface 600 may also display an option to buy the song or item being presented 610. In some embodiments, the item being presented may be a sample of a song, allowing only a portion of the song to be presented. The option to buy the song 610 may allow a player to obtain the entire song being presented and add the song to the player's collection of media.

The example user interface 600 may also provide recommendations 612 for songs or other items that the user might also enjoy based on the item being presented. For example, a recommendation for a song similar to the song being presented may be provided to a user so that the user can sample and/or buy the song.

The example user interface 600 may further provide an option to indicate that the player likes 614 the item being presented, an option to comment 616 on the item being presented, and an option to share 618 the item being presented.

In the example of FIG. 6B, the virtual venue may be displayed as a theater. When a presentation request to present an item within a set of media is received, the item may be presented in the virtual venue in response to the presentation request. In the example of FIG. 6B, once a presentation request is received, the virtual venue for playing the item may be displayed, including displaying a movie screen 652 for playing the video and an audience 654. The selected item may then be presented via the movie screen 652.

The audience 654 in the example user interface 650 may be displayed in the virtual venue. The audience 654 may include avatars for one or more additional players associated with the item being presented. For example, the audience may include avatars for one or more additional players who have been invited by the player to experience the item being presented, one or more additional players who also have the item within their collection of media, one or more additional players who have indicated that they enjoy the item being presented, and the like. Additionally, the player may use the pointer 656 to hover over an avatar of one or more players so that the name 658 of the player may be displayed.

The example user interface 650 may also display an option to buy the video or item being presented 660. In some embodiments, the item being presented may be a sample of a movie or video, allowing only a portion of the movie or video to be presented. The option to buy the video 660 may allow a player to obtain the entire video being presented and add the video to the player's collection of media.

The example user interface 650 may also provide recommendations 662 for videos or other items that the user might also enjoy based on the item being presented. For example, a recommendation for a video similar to the video being presented may be provided to a user so that the user can sample and/or buy the video.

The example user interface 650 may further provide an option to indicate that the player likes 664 the item being presented, an option to comment 666 on the item being presented, and an option to share 668 the item being presented.

Figure 7:
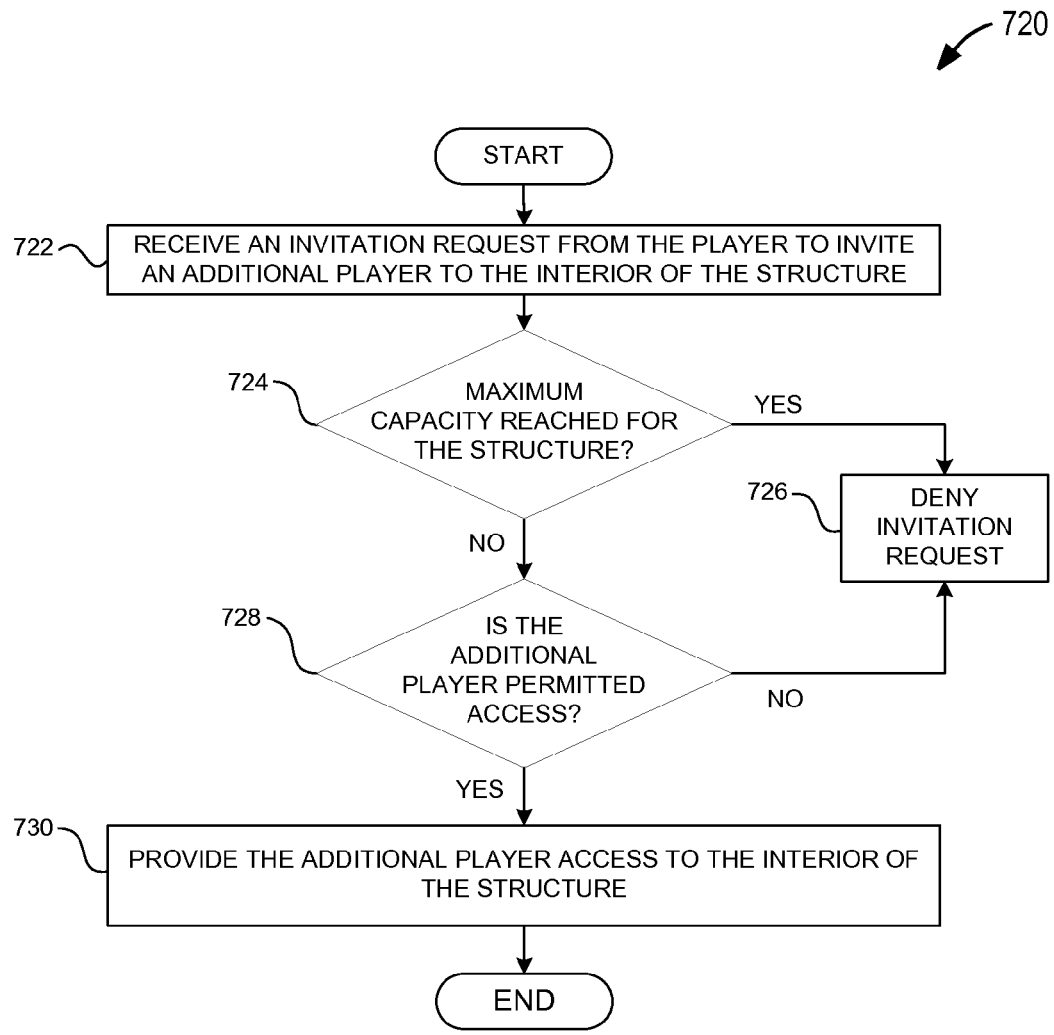
FIG. 7 is a flowchart illustrating an example method for allowing a player to invite additional players to a viewable or zoomable location in which media is being played, according to some embodiments.

FIG. 7 is a flowchart illustrating an example method 720 for allowing a player to invite additional players to a zoomable location in which media is being presented. In some embodiments, the method 720 may be performed using the game networking system 108.2 and may present a player with the ability to allow additional players to experience media being presented in the zoomable virtual structure.

The method 720 may begin, at operation 722, by receiving an invitation request from the player to invite an additional player to the interior of the virtual structure. That is, the invitation request may request that an additional player be given access to enter the zoomable virtual structure.

At operation 724, it is determined whether the maximum player capacity has been reached for the virtual structure. In some embodiments, there may be a limit to the number of players allowed in the virtual structure. For example, due to copyright laws, a certain number of people experiencing media being presented may constitute an unlawful public performance of a work. Thus, a virtual structure may be limited to a particular number of additional players that may enter the structure and experience the media being presented. If the maximum capacity for the structure has been reached (e.g., the number of additional players already inside the virtual structure has reached the maximum capacity), then the invitation request is denied at operation 726.

If the maximum capacity for the structure has not been reached (or if there is no maximum capacity limit), at operation 728, it is determined whether the additional player is permitted access to the zoomable virtual structure. An additional player may be permitted access for any number of reasons and denied access for any number of reasons. For example, an additional player may be permitted or denied access based on preferences of the player of the virtual gameboard. In some embodiments, the additional player may be permitted or denied access based on the additional player's status, such as, for example, frequency of game play, social actions, game levels accessible by the additional player, and the like.

If the additional player is not permitted access to the zoomable virtual structure, at operation 726, the invitation request may be denied. If the additional player is permitted access to the zoomable virtual structure, at operation 730, the additional player may be provided access to the interior of the zoomable virtual structure. Once the additional player has entered the zoomable virtual structure, the additional player may be able to experience the media being presented in the zoomable virtual structure.

Figure 8:
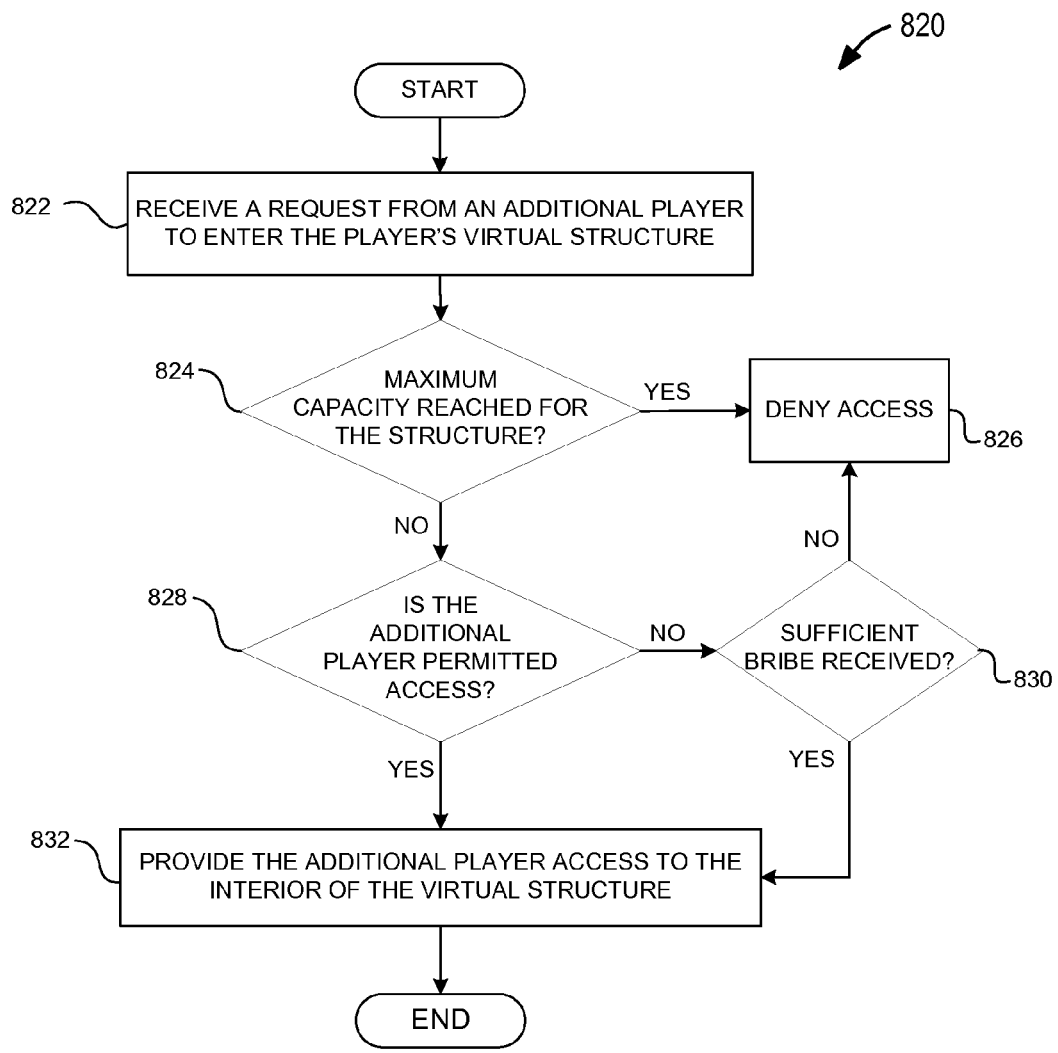
FIG. 8 is a flowchart illustrating an example method for allowing an additional player to request entrance into a viewable or zoomable location in which media is being played, according to some embodiments.

FIG. 8 is a flowchart illustrating an example method 820 for allowing an additional player to request entrance into a zoomable location in which media is being presented. In some embodiments, the method 820 may be performed using the game networking system 108.2 and may present an additional player with the ability to access and experience media being presented in the zoomable virtual structure in response to a request from the additional player to enter the structure.

The method 820 may begin, at operation 822, by receiving a request from an additional player to enter a player's virtual structure on the player's virtual gameboard. Similar to operation 724 of method 720, at operation 824, it is determined whether the maximum player capacity has been reached for the virtual structure. If the maximum capacity for the structure has been reached (e.g., the number of additional players already inside the virtual structure has reached the maximum capacity), at operation 826, access to the virtual structure is denied.

If the maximum capacity for the structure has not been reached (or if there is no maximum capacity limit), at operation 828, it is determined whether the additional player is permitted access to the zoomable virtual structure. Similar to operation 728 of method 720, an additional player may be permitted access for any number of reasons and denied access for any number of reasons. For example, the additional player may be associated with a block request received from the player of the virtual gameboard, in which case the additional player may be prevented from accessing the interior of the zoomable virtual structure.

If the additional player is not permitted access to the zoomable virtual structure for any reason, the additional player may be provided with an opportunity to bribe a virtual doorman of the virtual structure. A bribe request may be received from the additional player. The bribe request may offer an item of value in exchange for access to the interior of the particular virtual structure. The item of value may be any item of value, such as, for example, legal currency or virtual currency. At operation 830, it is determined whether the bribe received from the additional player is sufficient. The bribe may be sufficient if the item of value meets a particular bribery threshold for sufficiency of the bribe.

If the bribe received is not sufficient, at operation 826, access to the virtual structure is denied. If the bribe is sufficient, or if the additional player was permitted access at operation 828, at operation 832, the additional player may be provided access to the interior of the virtual structure. Once the additional player has entered the zoomable virtual structure, the additional player may be able to experience the media being presented in the zoomable virtual structure.

Figure 9:
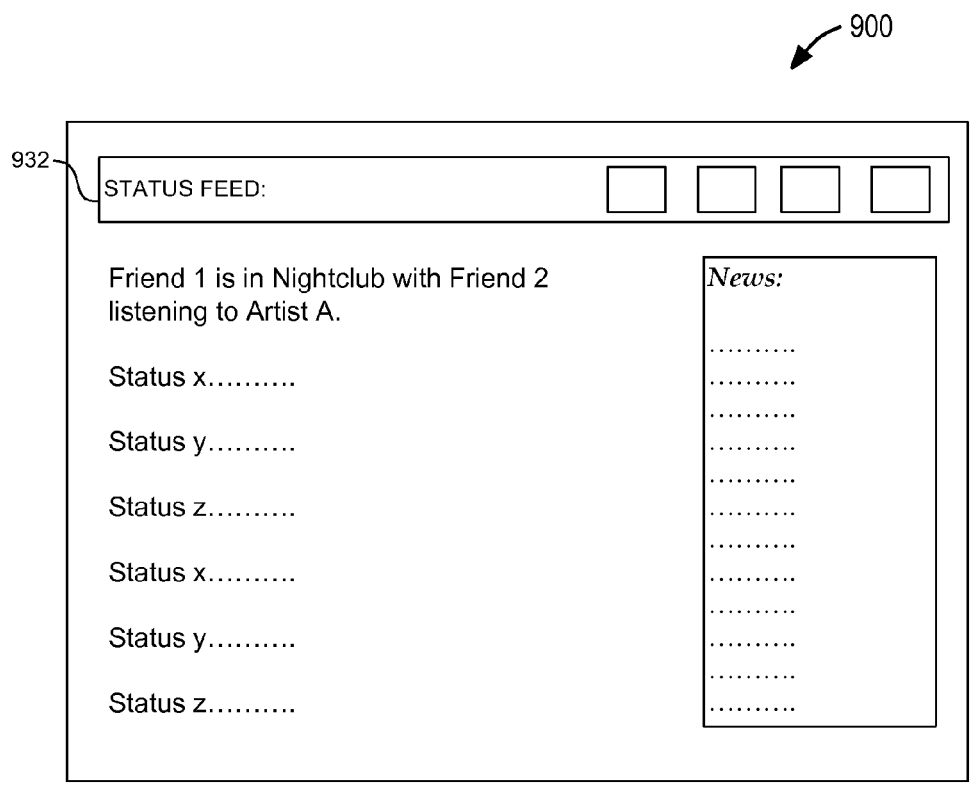
FIG. 9 is an example user interface depicting a status feed indicating players located within a viewable or zoomable location, according to some embodiments.

FIG. 9 is an example user interface 900 depicting a public notification or status feed indicating players located within a zoomable location. The public notification or status feed 932 may indicate a virtual location of a particular virtual structure and an identity of any additional players within the virtual location. In the example depicted in FIG. 9, the public notification or status feed 932 indicates that "Friend 1 is in Nightclub with Friend 2 listening to Artist A." The public notification or status feed 932 may inform players of the virtual locations of other players and the activity occurring in those virtual locations.

Figure 10:
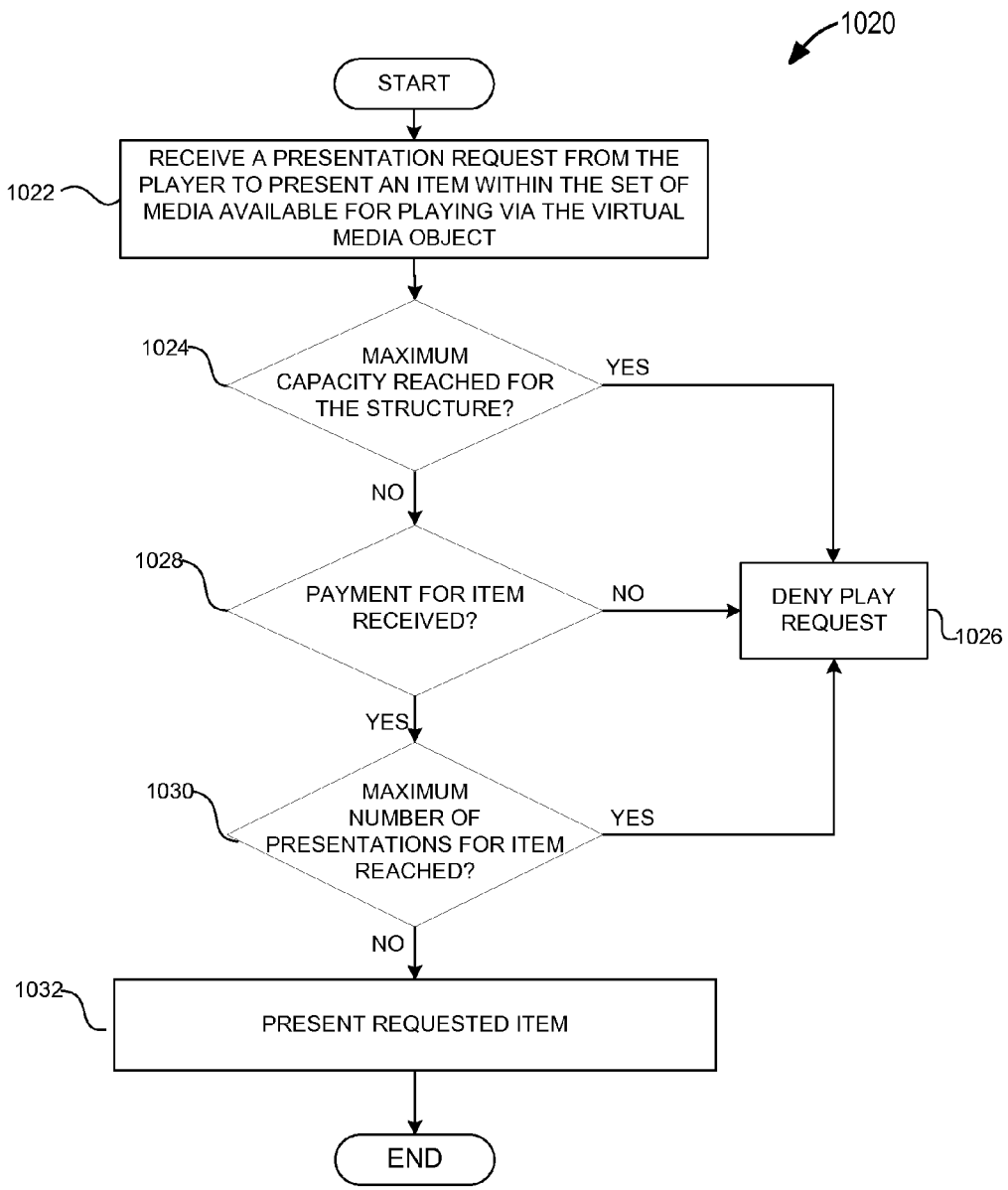
FIG. 10 is a flowchart illustrating an example method for playing a requested item within a set of media, according to some embodiments.

FIG. 10 is a flowchart illustrating an example method 1020 for playing a requested item within a set of media. In some embodiments, the method 1020 may be performed using the game networking system 108.2 and may present an item in response to a presentation request requesting that an item within a set of media be presented.

The method 1020 may begin, at operation 1022, by receiving a presentation request from the player to present an item within the set of media available for playing via the virtual media object in a virtual structure. The presentation request may be received from the player owning the virtual gameboard having the virtual media object or may be received from an additional player who has entered a virtual structure of the player owning the virtual gameboard.

At operation 1024, it is determined whether the maximum capacity for the virtual structure has been reached. If the maximum capacity for the virtual structure has been reached, at operation 1026, the presentation request may be denied.

If the maximum capacity for the virtual structure has not been reached, at operation 1028, it is determined whether payment for the item to be presented has been received or whether payment is required. In some embodiments, the presentation request may include an offer of legal currency or virtual currency to present the item. In some embodiments, payment for the item requested may already have been received prior to the received presentation request. If the payment for the item has not been received or is an insufficient amount, at operation 1026, the presentation request may be denied.

If the payment received for the item is a sufficient amount, or if no payment was required, at operation 1030, it is determined whether a maximum number of plays allowed for the item has been reached. In some embodiments, an item may have a limit to the amount of times the item may be presented. If the maximum number of plays allowed for the item has been reached, at operation 1026, the presentation request may be denied.

If the maximum number of plays allowed for the item has not been reached (or if there is no such maximum limit), at operation 1032, the item that was requested may be presented.

Storing Media-Related Data

Figure 11:
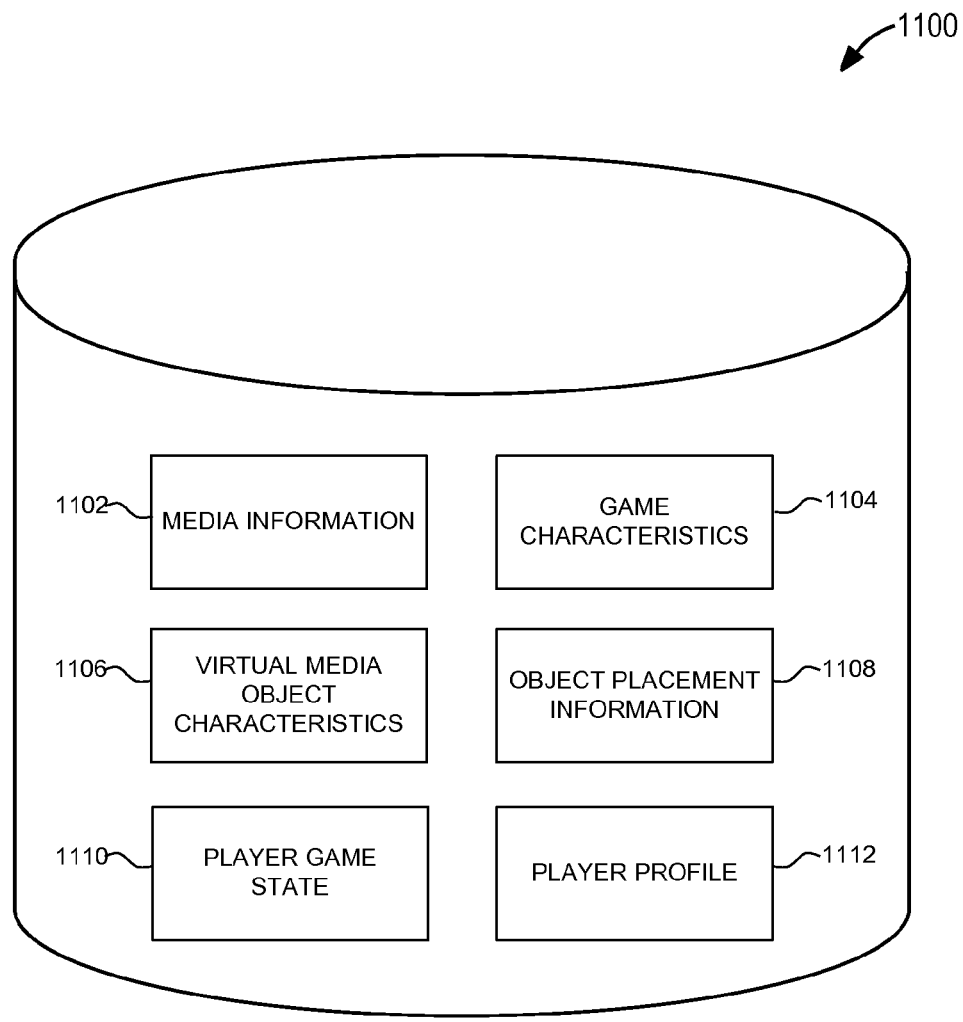
FIG. 11 is a block diagram showing an example database to store data related to performing an item from a set of media, according to some embodiments.

FIG. 11 is a block diagram showing an example database 1100 to store data related to performing an item from a set of media. The database 1100 may store media information 1102, game characteristics data 1104, virtual media object characteristics data 1106, object placement information 1108, player game state information 1110, and player profile information 1112.

Media information 1102 may include any information required to present media, including but not limited to the media itself, the location of the source of the media, any limits or preferences associated with the media, and the like.

Game characteristics 1104 may be any characteristics that may be associated with the particular virtual game being played. The game characteristics stored in database 1100 may include, but are not limited to, rules for playing the game, functions of different objects within the game, capabilities of different players, and the like. Using games by Zynga, Inc. as examples, game characteristics 1104 may includes characteristics for playing any of, for example, CityVille, FarmVille, Mafia Wars, Crime Nation, and the like.

Virtual media object characteristics data 1106 may include any set of characteristics associated with a virtual media object. These characteristics may include characteristics specific to a particular location, gameboard, player, and the like. For example, virtual media object characteristics data 1106 may include data associated with characteristics for displaying available media, such as, for example, displaying via a jukebox.

Object placement information 1108 includes any data required to place an object in a particular location on the virtual gameboard. For example, the object placement information 1108 may include information for placing a virtual structure at a particular location.

The database 1100 may also include database tables for storing a player game state information 1110 that may include information about the player's virtual gameboard, the player's character, or other game-related information. For example, player game state information 1110 may include virtual objects owned or used by the player, placement positions for virtual structural objects in the player's virtual gameboard, and the like. Player game state information 1110 may also include in-game obstacles of tasks for the player (e.g., new obstacles, current obstacles, completed obstacles, and the like), the player's character attributes (e.g., character health, character energy, amount of coins, amount of cash or virtual currency, and the like.), and the like.

The database 1100 may also include database tables for storing a player profile information 1112 that may include user-provided player information that is gathered from the player, the player's client device, or an affiliated social network. The user-provided player information may include the player's demographic information, the player's location information (e.g., a historical record of the player's location during game play as determined via a GPS-enabled device or the Internet Protocol (IP) address for the player's client device), the player's localization information (e.g., a list of languages chosen by the player), the types of games played by the player, and the like.

In some example embodiments, the player profile information 1112 may also include derived player information that may be determined from other information stored in the database 1100. The derived player information may include information that indicates the player's level of engagement with the virtual game, the player's friend preferences, the player's reputation, the player's pattern of game-play, and the like. For example, the game networking system 108.2 may determine the player's friend preferences based on player attributes that the player's first-degree friends have in common, and may store these player attributes as friend preferences in the player profile information 1112. Furthermore, the game networking system 108.2 may determine reputation-related information for the player based on user-generated content (UGC) from the player or the player's $N^{th}$ degree friends (e.g., in-game messages or social network messages), and may store this reputation-related information in the player profile information 1112. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 108.2 may determine the player's likelihood to lead value based on information from other players that interact with this player. For example, the game networking system 108.2 may determine the player's likelihood to lead value by measuring the other players' satisfaction in the virtual game, measuring their satisfaction from their interaction with the player, measuring the game-play frequency for the other players in relation to their interaction frequency with the player (e.g., the ability for the player to retain others), and/or the like.

The game networking system 108.2 may also determine the player's likelihood to lead value based on information about the player's interactions with others and the outcome of these interactions. For example, the game networking system 108.2 may determine the player's likelihood to lead value by measuring the player's amount of interaction with other players (e.g., as measured by a number of challenges in which the player cooperates with others, and/or an elapsed time duration related thereto), the player's amount of communication with other players, the tone of the communication sent or received by the player, and/or the like. Moreover, the game networking system 108.2 may determine the player's likelihood to lead value based on determining a likelihood for the other players to perform a certain action in response to interacting or communicating with the player and/or the player's virtual environment.

Example Game Systems, Social Networks, and Social Graphs

In an multiplayer game, players control player characters (PCs), a game engine controls non-player characters (NPCs), and the game engine also manages player character state and tracks states for currently active (e.g., online) players and currently inactive (e.g., offline) players. A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits, or the obtaining of some assets (e.g., health, money, strength, inventory, land, etc.). A game engine may determine the outcome of a game event according to game rules (e.g., "a character with less than 5 health points will be prevented from initiating an attack"), based on a character's state, and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account not only the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on Player A's team (e.g., the friends that are listed as being in the player's mob/gang/set/army/business/crew/etc. depending on the nature of the game) may be playing the virtual game and choose to confront Player B who has 20 friends on Player B's team. In some embodiments, a player may only have first-degree friends on the player's team. In other embodiments, a player may also have second-degree and higher degree friends on the player's team. To resolve the game event, in some embodiments, the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Example Game Networking Systems

A virtual game may be hosted by the game networking system 108.2, which can be accessed using any suitable connection 110 with a suitable client device 104. A player may have a game account on the game networking system 108.2, wherein the game account may contain a variety of information associated with the player (e.g., the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 accesses a virtual game and controls the game's progress via the client device 104 (e.g., by inputting commands to the game at the client device 104). The client device 104 can display the game interface, receive inputs from the player 102, transmit user inputs or other events to the game engine, and receive instructions from the game engine. The game engine can be executed on any suitable system (such as, for example, the client device 104, the social networking system 108.1, or the game networking system 108.2). For example, the client device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 accesses particular game instances of a virtual game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player is only accessible by that specific player. For example, a first player may access a first game instance when playing a virtual game, and this first game instance may be inaccessible to all other players. In other embodiments, a game instance associated with a specific player is accessible by one or more other players, either synchronously or asynchronously with the specific player's game play. For example, a first player may be associated with a first game instance, but the first game instance may be accessed by all first-degree friends in the first player's social network.

In some embodiments, the set of in-game actions available to a specific player is different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in a farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine interfaces with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in a multiplayer game.

In some embodiments, the social graph is managed by the game networking system 108.2, which is managed by the game operator. In other embodiments, the social graph is part of a social networking system 108.1 managed by a third party (e.g., Facebook, Friendster, Myspace). In yet other embodiments, the player 102 has a social network on both the game networking system 108.2 and the social networking system 108.1, wherein the player 102 can have a social network on the game networking system 108.2 that is a subset, superset, or independent of the player's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the Player 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to Player 201. As used herein, the terms "player" and "user" can be used interchangeably and can refer to any user in a multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.1.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a player (or player character) has a social graph within a multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a player's in-game social network are formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (e.g., in disintermediated interactions or the like), but that could be the case.

Figure 12:
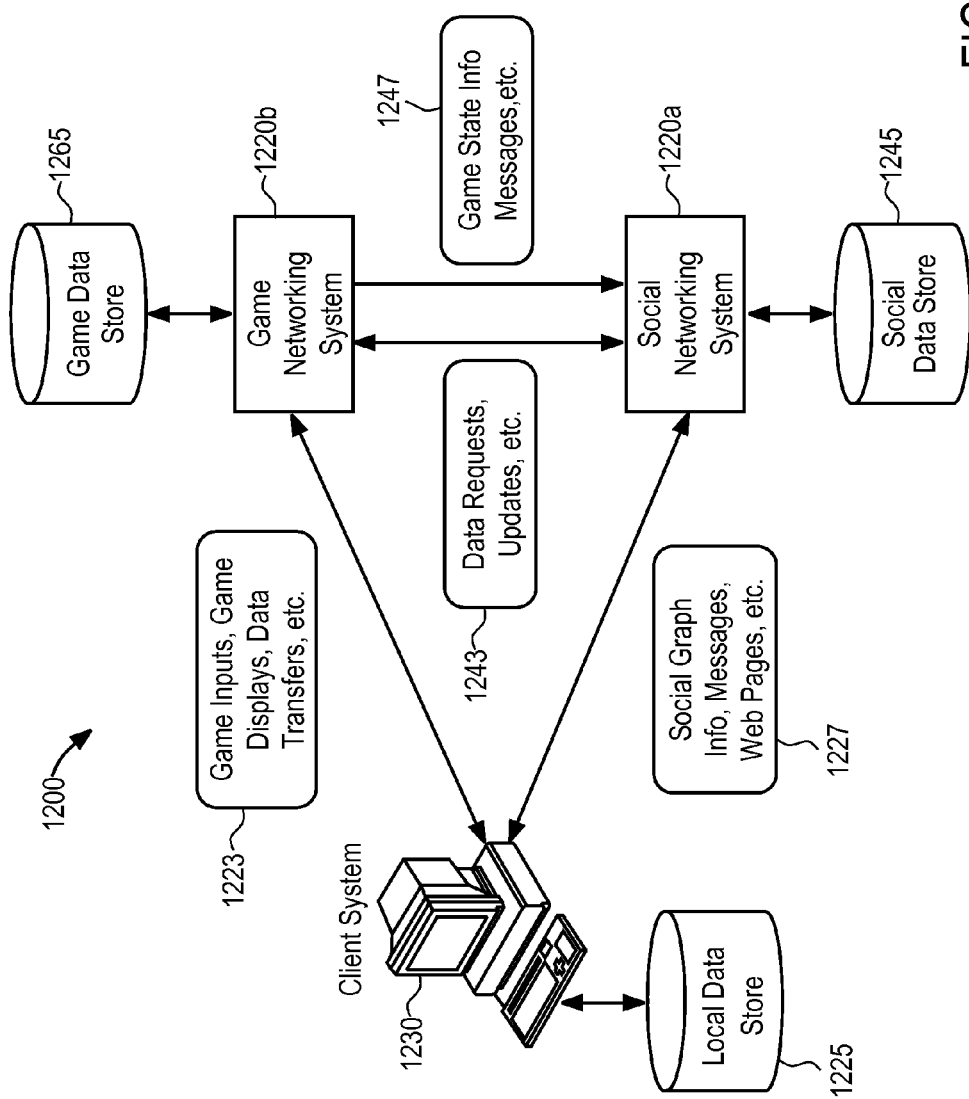
FIG. 12 is a diagrammatic representation of an example data flow between example components of the example system of FIG. 1, according to some embodiments.

FIG. 12 is a diagrammatic representation of an example data flow between example components of an example system 1200. One or more of the components of the example system 1200 may correspond to one or more of the components of the example system 100. In some embodiments, system 1200 includes a client system 1230, a social networking system 1220*a*, and a game networking system 1220*b*. The components of system 1200 can be connected to each other in any suitable configuration, using any suitable type of connection. The components may be connected directly or over any suitable network. The client system 1230, the social networking system 1220*a*, and the game networking system 1220*b* may have one or more corresponding data stores such as the local data store 1225, the social data store 1245, and the game data store 1265, respectively.

The client system 1230 may receive and transmit data 1223 to and from the game networking system 1220*b*. This data can include, for example, a web page, a message, a game input, a game display, a HTTP packet, a data request, transaction information, and other suitable data. At some other time, or at the same time, the game networking system 1220*b* may communicate data 1243, 1247 (e.g., game state information, game system account information, page info, messages, data requests, updates, etc.) with other networking systems, such as the social networking system 1220*a* (e.g., Facebook, Myspace, etc.). The client system 1230 can also receive and transmit data 1227 to and from the social networking system 1220*a*. This data can include, for example, web pages, messages, social graph information, social network displays, HTTP packets, data requests, transaction information, updates, and other suitable data.

Communication between the client system 1230, the social networking system 1220*a*, and the game networking system 1220*b* can occur over any appropriate electronic communication medium or network using any suitable communications protocols. For example, the client system 1230, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses a virtual game on the game networking system 1220*b*, the BLOB containing the game state for the instance corresponding to the player may be transmitted to the client system 1230 for use by a client-side executed object to process. In some embodiments, the client-side executable is a FLASH-based game, which can de-serialize the game state data in the BLOB. As a player plays the game, the game logic implemented at the client system 1230 maintains and modifies the various game state parameters locally. The client-side game logic may also batch game events, such as mouse clicks, and transmit these events to the game networking system 1220*b*. Game networking system 1220*b* may itself operate by retrieving a copy of the BLOB from a database or an intermediate memory cache (memcache) layer. The game networking system 1220*b* can also de-serialize the BLOB to resolve the game state parameters and execute its own game logic based on the events in the batch file of events transmitted by the client to synchronize the game state on the server side. The game networking system 1220*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a player selects one or more actions to perform. The web pages may be displayed in a browser client executed on the client system 1230. For example, a client application downloaded to the client system 1230 may operate to serve a set of web pages to a player. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media player plug-in. In some embodiments, one or more described web pages is associated with or accessed by the social networking system 1220*a*. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at the client system 1230, either caused by an action of a game player or by the game logic itself, the client system 1230 may need to inform the game networking system 1220*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies.

In some embodiments, one or more objects of a game are represented as Adobe Flash objects. Flash may manipulate vector and raster graphics, and supports bidirectional streaming of audio and video. "Flash" may mean the authoring environment, the player, or the application files. In some embodiments, the client system 1230 may include a Flash client. The Flash client may be configured to receive and run the Flash application or game object code from any suitable networking system (such as, for example, the social networking system 1220*a* or the game networking system 1220*b*). In some embodiments, the Flash client is run in a browser client executed on the client system 1230. A player can interact with Flash objects using the client system 1230 and the Flash client. The Flash objects can represent a variety of in-game objects. Thus, the player may perform various in-game actions on various in-game objects by making various changes and updates to the associated Flash objects.

In some embodiments, in-game actions are initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In some embodiments, when the player makes a change to a Flash object representing an in-game object, the client-executed game logic may update one or more game state parameters associated with the in-game object. To ensure synchronization between the Flash objects shown to the player at the client system 1230, the Flash client may send the events that caused the game state changes to the in-game object to the game networking system 1220*b*. However, to expedite the processing, and hence the speed of the overall gaming experience, the Flash client may collect a batch of some number of events or updates into a batch file. The number of events or updates may be determined by the Flash client dynamically or determined by the game networking system 1220b based on server loads or other factors. For example, client system 1230 may send a batch file to the game networking system 1220b whenever 50 updates have been collected or after a threshold period of time, such as every minute.

As used herein, the term "application event data" may refer to any data relevant to a computer-implemented virtual game application that may affect one or more game state parameters, including, for example and without limitation, changes to player data or metadata, changes to player social connections or contacts, player inputs to the game, and events generated by the game logic. In some embodiments, each application datum has a name and a value. The value of an application datum may change at any time in response to the game play of a player or in response to the game engine (e.g., based on the game logic). In some embodiments, an application data update occurs when the value of a specific application datum is changed.

In some embodiments, when a player plays a virtual game on the client system 1230, the game networking system 1220b serializes all the game-related data, including, for example and without limitation, game states, game events, and user inputs, for this particular user and this particular game into a BLOB and may store the BLOB in a database. The BLOB may be associated with an identifier that indicates that the BLOB contains the serialized game-related data for a particular player and a particular virtual game. In some embodiments, while a player is not playing the virtual game, the corresponding BLOB may be stored in the database. This enables a player to stop playing the game at any time without losing the current state of the game the player is in. When a player resumes playing the game next time, game networking system 1220b may retrieve the corresponding BLOB from the database to determine the most-recent values of the game-related data. In some embodiments, while a player is playing the virtual game, the game networking system 1220b also loads the corresponding BLOB into a memory cache so that the game system may have faster access to the BLOB and the game-related data contained therein.

Figure 13:
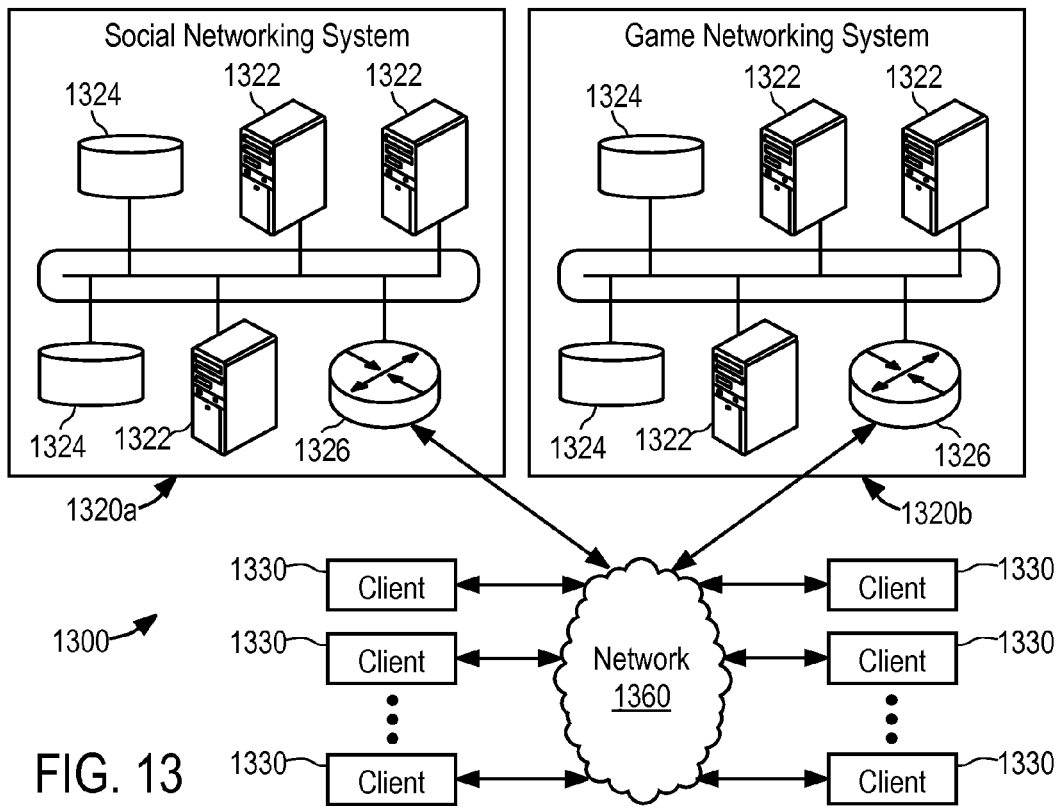
FIG. 13 is a schematic diagram showing an example network environment, in which various example embodiments may operate, according to some embodiments.

Various embodiments may operate in a WAN environment, such as the Internet, including multiple network addressable systems. FIG. 13 is a schematic diagram showing an example network environment 1300, in which various example embodiments may operate. Network cloud 1360 generally represents one or more interconnected networks, over which the systems and hosts described herein can communicate. Network cloud 1360 may include packet-based WANs (such as the Internet), private networks, wireless networks, satellite networks, cellular networks, paging networks, and the like. As FIG. 13 illustrates, various embodiments may operate in a network environment 1300 comprising one or more networking systems, such as a social networking system 1320a, a game networking system 1320b, and one or more client systems 1330. The components of the social networking system 1320a and the game networking system 1320b operate analogously; as such, hereinafter they may be referred to simply as the networking system 1320. The client systems 1330 are operably connected to the network environment 1300 via a network service provider, a wireless carrier, or any other suitable means.

The networking system 1320 is a network addressable system that, in various example embodiments, comprises one or more physical servers 1322 and data stores 1324. The one or more physical servers 1322 are operably connected to computer network cloud 1360 via, by way of example, a set of routers and/or networking switches 1326. In an example embodiment, the functionality hosted by the one or more physical servers 1322 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 1322 may host functionality directed to the operations of the networking system 1320. Hereinafter servers 1322 may be referred to as server 1322, although the server 1322 may include numerous servers hosting, for example, the networking system 1320, as well as other content distribution servers, data stores, and databases. Data store 1324 may store content and data relating to, and enabling, operation of, the networking system 1320 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like.

Logically, data store 1324 corresponds to one or more of a variety of separate and integrated databases, such as relational databases and object-oriented databases, that maintain information as an integrated collection of logically related records or files stored on one or more physical systems. Structurally, data store 1324 may generally include one or more of a large class of data storage and management systems. In some embodiments, data store 1324 may be implemented by any suitable physical system(s) including components, such as one or more database servers, mass storage media, media library systems, storage area networks, data storage clouds, and the like. In one example embodiment, data store 1324 includes one or more servers, databases (e.g., MySQL), and/or data warehouses. Data store 1324 may include data associated with different networking system 1320 users and/or client systems 1330.

The client system 1330 is generally a computer or computing device including functionality for communicating (e.g., remotely) over a computer network. The client system 1330 may be a desktop computer, laptop computer, PDA, in- or out-of-car navigation system, smart phone or other cellular or mobile phone, or mobile gaming device, among other suitable computing devices. Client system 1330 may execute one or more client applications, such as a Web browser.

When a user at a client system 1330 desires to view a particular webpage (hereinafter also referred to as target structured document) hosted by the networking system 1320, the user's web browser, or other document rendering engine or suitable client application, formulates and transmits a request to the networking system 1320. The request generally includes a URL or other document identifier as well as metadata or other information. By way of example, the request may include information identifying the user, a timestamp identifying when the request was transmitted, and/or location information identifying a geographic location of the user's client system 1330 or a logical network location of the user's client system 1330.

Although the example network environment 1300 described above and illustrated in FIG. 13 is described with respect to the social networking system 1320a and the game networking system 1320b, this disclosure encompasses any suitable network environment using any suitable systems. For example, a network environment may include online media systems, online reviewing systems, online search engines, online advertising systems, or any combination of two or more such systems.

Figure 14:
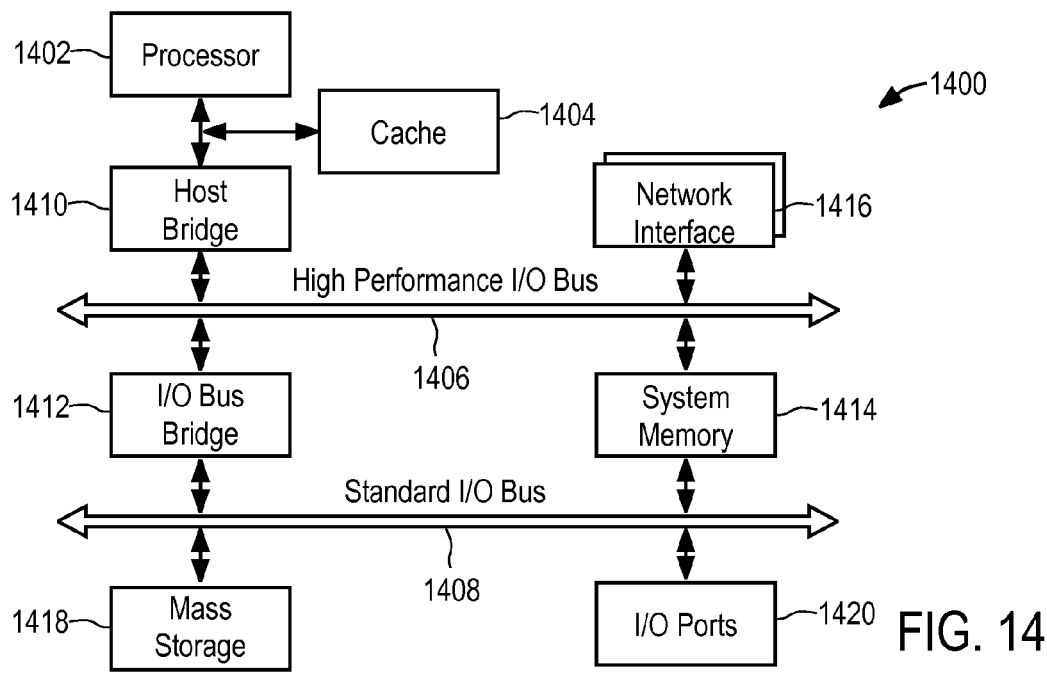
FIG. 14 is a block diagram illustrating an example computing system architecture, which may be used to implement one or more of the methodologies described herein, according to some embodiments.

FIG. 14 is a block diagram illustrating an example computing system architecture, which may be used to implement a server 1322 or a client system 1330. In one embodiment, the hardware system 1400 comprises a processor 1402, a cache memory 1404, and one or more executable modules and drivers, stored on a tangible computer-readable storage medium, directed to the functions described herein. Additionally, the hardware system 1400 may include a high performance input/output (I/O) bus 1406 and a standard I/O bus 1408. A host bridge 1410 may couple the processor 1402 to the high performance I/O bus 1406, whereas the I/O bus bridge 1412 couples the two buses 1406 and 1408 to each other. A system memory 1414 and one or more network/communication interfaces 1416 may couple to the bus 1406. The hardware system 1400 may further include video memory (not shown) and a display device coupled to the video memory. Mass storage 1418 and I/O ports 1420 may couple to the bus 1408. The hardware system 1400 may optionally include a keyboard, a pointing device, and a display device (not shown) coupled to the bus 1408. Collectively, these elements are intended to represent a broad category of computer hardware systems.

The elements of the hardware system 1400 are described in greater detail below. In particular, the network interface 1416 provides communication between the hardware system 1400 and any of a wide range of networks, such as an Ethernet (e.g., IEEE 802.3) network, a backplane, and the like. The mass storage 1418 provides permanent storage for the data and programming instructions to perform the above-described functions implemented in servers 1322 of FIG. 13, whereas system memory 1414 (e.g., DRAM) provides temporary storage for the data and programming instructions when executed by the processor 1402. I/O ports 1420 are one or more serial and/or parallel communication ports that provide communication between additional peripheral devices, which may be coupled to the hardware system 1400.

The hardware system 1400 may include a variety of system architectures, and various components of the hardware system 1400 may be rearranged. For example, cache memory 1404 may be on-chip with the processor 1402. Alternatively, the cache memory 1404 and the processor 1402 may be packed together as a "processor module," with processor 1402 being referred to as the "processor core." Furthermore, certain embodiments of the present disclosure may neither require nor include all of the above components. For example, the peripheral devices shown coupled to the standard I/O bus 1408 may couple to the high performance I/O bus 1406. In addition, in some embodiments, only a single bus may exist, with the components of the hardware system 1400 being coupled to the single bus. Furthermore, the hardware system 1400 may include additional components, such as additional processors, storage devices, or memories.

An operating system manages and controls the operation of the hardware system 1400, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

One or more features from any embodiment may be combined with one or more features of any other embodiment without departing from the scope of the disclosure.

A recitation of "a," "an," or "the" is intended to mean "one or more" unless specifically indicated to the contrary. In addition, it is to be understood that functional operations, such as "awarding," "locating," "permitting," and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
generating a game instance of a computer-implemented game;
providing to a player a graphical user interface displaying an exterior of a virtual structure of the game instance;
receiving, via a device of the player, a request to view an interior of the virtual structure;
displaying the interior of the virtual structure in response to the request including displaying a virtual media object in the interior of the virtual structure, the virtual media object being associated with media presentable to the player of the game instance via the device;
receiving, via the device of the player, a block request from the player to prevent a first additional player of the one or more additional players from accessing the interior of the virtual structure, the block request preventing access to the interior of the virtual structure due the first additional player's status, the status related to game play of the first additional player;
receiving a bribe request from the first additional player blocked according to the block request from the player, the bribe request comprising an offer of a media item of value in exchange for access to the interior of the virtual structure; and
providing to the first additional player access to the interior of the virtual structure if the media item of value meets a bribery threshold.

2. The method of claim 1, wherein the virtual media object is displayed when displaying the interior of the virtual structure and is not displayed when displaying the exterior of the virtual structure.

3. The method of claim 1, wherein displaying the interior of the virtual structure includes displaying the interior of the virtual structure without displaying the exterior of the virtual structure.

4. The method of claim 1, wherein displaying the exterior of the virtual structure includes displaying the exterior of the virtual structure without displaying the interior of the virtual structure.

5. The computer-implemented method of claim 1, further comprising:
receiving, via the device of the player, a present request to present a media item within the media presentable to the player; and
presenting the media item in response to the present request.

6. The computer-implemented method of claim 5, wherein the presenting of the media item in response to the present request includes displaying a virtual venue to perform the media item and performing the media item.

7. The computer-implemented method of claim 6, further comprising:
displaying the one or more additional players within the virtual venue, the one or more additional players being associated with the media item.

8. The computer-implemented method of claim 5, further comprising:
providing one or more media recommendations related to the media item being presented.

9. The computer-implemented method of claim 5, wherein the present request includes an offer of legal currency and wherein presenting the media item occurs if the offer of legal currency is a sufficient amount.

10. The computer-implemented method of claim 5, wherein the present request includes an offer of virtual currency and wherein presenting the media item occurs if the offer of virtual currency is a sufficient amount.

11. The computer-implemented method of claim 1, the media presentable to the player including any one or combination of the following: one or more songs, one or more videos, one or more photos, or one or more news articles.

12. The computer-implemented method of claim 1, wherein providing the graphical user interface displaying the exterior of the virtual structure includes providing an indication associated with the virtual structure indicating the interior of the virtual structure is displayable.

13. The computer-implemented method of claim 1, wherein providing the graphical user interface displaying the exterior of the virtual structure includes providing an indication associated with the virtual structure indicating additional content in the interior of the virtual structure, the additional content being content previously unavailable to the player.

14. The computer-implemented method of claim 1, wherein displaying the interior of the virtual structure includes providing, to the device of the player, display data to display the interior of the virtual structure.

15. The computer-implemented method of claim 1, further comprising:
receiving, via the device of the player, an invitation request to invite the one or more additional players to access the interior of the virtual structure; and
providing to the one or more additional players access to the interior of the virtual structure including providing access to a performance of one or more media items within the media presentable to the player.

16. The computer-implemented method of claim 15, wherein providing access to the interior of the virtual structure is limited to a particular number of additional players from the one or more additional players.

17. The computer-implemented method of claim 15, wherein providing to the one or more additional players access to the interior of the virtual structure includes providing access based on permissions associated with each additional player.

18. The computer-implemented method of claim 17, the permissions associated with each additional player being based on preferences of the player.

19. The computer-implemented method of claim 17, the permissions associated with each additional player being based on a player status associated with any one or combination of frequency of game play, social actions, or game levels accessible by the additional player.

20. The computer-implemented method of claim 1, further comprising:
preventing the first additional player from the one or more additional players from accessing the interior of the virtual structure in response to receiving the block request from the player.

21. The computer-implemented method of claim 1, wherein the media item of value is an amount of legal currency.

22. The computer-implemented method of claim 1, wherein the media item of value is an amount of virtual currency.

23. The computer-implemented method of claim 1, further comprising:
providing a public notification indicating a virtual location of the virtual structure and an identity of the one or more additional players within the virtual location.

24. The computer-implemented method of claim 1, wherein the game instance is associated with a game state of the player.

25. A system, comprising:
a hardware-implemented game generation module configured to generate a game instance of a computer-implemented game;
a hardware-implemented display module configured to provide display data associated with displaying an exterior of a virtual structure of the game instance and display data associated with displaying an interior of the virtual structure including displaying a virtual media object in the interior of the virtual structure;
a hardware-implemented presentation module configured to receive, via a device of the player, a request to view the interior of the virtual structure, wherein the hardware-implemented display module is configured to provide the display data of a graphical user interface displaying the interior of the virtual structure in response to the request, wherein the virtual media object is associated with media presentable to the player of the game instances;
wherein the hardware-implemented presentation module is further configured to:
receive, via the device of the player, a block request from the player to prevent a first additional player of the one or more additional players from accessing the interior of the virtual structure, the block request preventing access to the interior of the virtual structure due the first additional player's status, the status related to game play of the first additional player;
to receive a bribe request from the first additional player blocked according to the block request from the player, the bribe request comprising an offer of a media item of value in exchange for access to the interior of the virtual structure; and
to provide to the first additional player access to the interior of the virtual structure if the media item of value meets a bribery threshold.

26. The system of claim 25, wherein the virtual media object is displayed when displaying the interior of the virtual structure, and is not displayed when displaying the exterior of the virtual structure.

27. The system of claim 25, wherein displaying the interior of the virtual structure includes displaying the interior of the virtual structure without displaying the exterior of the virtual structure.

28. The system of claim 25, wherein displaying the exterior of the virtual structure includes displaying the exterior of the virtual structure without displaying the interior of the virtual structure.

29. A non-transitory computer-readable storage medium storing instructions which, when executed by one or more processors, cause the one or more processors to perform a method, comprising:

generating a game instance of a computer-implemented game;

providing to a player a graphical user interface displaying an exterior of a virtual structure of the game instance;

receiving, via a device of the player, a request to view an interior of the virtual structure;

displaying the interior of the virtual structure in response to the request including displaying a virtual media object in the interior of the virtual structure, the virtual media object being associated with media presentable to the player of the game instance via the device;

receiving, via the device of the player, a block request from the player to prevent a first additional player of the one or more additional players from accessing the interior of the virtual structure, the block request preventing access to the interior of the virtual structure due the first additional player's status, the status related to game play of the first additional player;

receiving a bribe request from the first additional player blocked according to the block request from the player, the bribe request comprising an offer of a media item of value in exchange for access to the interior of the virtual structure; and providing to the first additional player access to the interior of the virtual structure if the media item of value meets a bribery threshold.

* * * * *

UNITED STATES PATENT AND TRADEMARK OFFICE
CERTIFICATE OF CORRECTION

| | | |
|---|---|---|
| PATENT NO. | : 8,845,423 B1 | Page 1 of 1 |
| APPLICATION NO. | : 13/734173 | |
| DATED | : September 30, 2014 | |
| INVENTOR(S) | : Monahan et al. | |

It is certified that error appears in the above-identified patent and that said Letters Patent is hereby corrected as shown below:

In the Claims

In column 26, line 39, in Claim 25, delete "instances;" and insert --instance;--, therefor Signed and Sealed this
Third Day of February, 2015

Michelle K. Lee
*Deputy Director of the United States Patent and Trademark Office*